United States Patent [19]

Postlewait

[11] Patent Number: 4,998,207

[45] Date of Patent: Mar. 5, 1991

[54] METHOD OF MANUFACTURE OF CIRCUIT BOARDS

[75] Inventor: L. Buck Postlewait, Cheraw, S.C.

[73] Assignee: Cooper Industries, Inc., Houston, Tex.

[21] Appl. No.: 403,911

[22] Filed: Sep. 1, 1989

Related U.S. Application Data

[63] Continuation-in-part of Ser. No. 150,595, Feb. 1, 1988, abandoned.

[51] Int. Cl.[5] .......................... G06F 15/46; B23K 26/00

[52] U.S. Cl. .......................... 364/474.08; 219/121.69; 250/458.1; 364/490

[58] Field of Search .......................... 364/474.08, 490; 219/121.68, 121.69; 250/458.1

[56] References Cited

U.S. PATENT DOCUMENTS

| | | | |
|---|---|---|---|
| 4,358,659 | 11/1982 | Spohnheimer | 219/121.69 |
| 4,374,314 | 2/1983 | Deacutis | 219/121.69 |
| 4,381,441 | 4/1983 | Desmarais et al. | 219/121.69 |
| 4,403,133 | 9/1983 | Turner et al. | 219/121.69 |
| 4,439,754 | 3/1984 | Madden, Jr. | 219/121.69 |
| 4,580,030 | 4/1986 | Takeuchi | 219/121.69 |
| 4,594,265 | 6/1986 | Van Vonno et al. | 219/121.69 |
| 4,672,209 | 6/1987 | Karasaki et al. | 250/458.1 |
| 4,700,225 | 10/1987 | Hara et al. | 250/458.1 |
| 4,772,125 | 9/1988 | Yoshimura et al. | 250/458.1 |
| 4,772,774 | 9/1988 | Lejeune et al. | 219/121.69 |

*Primary Examiner*—Felix D. Gruber

*Attorney, Agent, or Firm*—Michael F. Heim; David A. Rose; Ned L. Conley

[57] ABSTRACT

A method for manufacturing circuit boards which control digital displays includes a TV camera which images the digital display. The output of the TV camera is fed into a computer which controls a laser trimmer. The laser trimmer trims the resistors on the controlling circuit board until the desired value and characteristics are obtained on the digital display.

10 Claims, 4 Drawing Sheets

METHOD OF MANUFACTURE OF CIRCUIT BOARDS

This is a continuation-in-part of copending application Ser. No. 07/150,595 filed on 2/1/88 and now abandoned.

BACKGROUND OF THE INVENTION

The present invention relates to a method for manufacturing circuit boards; more particularly the present invention relates to a method of manufacturing inspecting and calibrating circuit boards which control displayed numerals in a digital display device.

Digital display devices are commonly used in many types of equipment. One example where such displays are used is with a temperature controlled soldering iron wherein the temperature of the soldering iron is displayed as a digital readout. In such applications, electrical power is supplied to a control box. The control box both sends electrical power to the soldering iron and receives electrical signals from the soldering iron indicative of temperature. These received electrical signals are used to control the supply of electrical power to the soldering iron and may also be displayed digitally.

The control of the actual numerals and light quality of digital displays is accomplished by board mounted circuitry including an analog-digital converter. Such circuitry also includes a precisely controlled electrical resistance. In order to have a desired value of the displayed numerals the analog-digital converter must be calibrated. In order to have the proper quality of video display, it is necessary that the displayed numbers are proper and that the various illuminated light bar segments which make up the numbers in the video display have the proper tilt, midpoint and brightness. Heretofore the accuracy of the displayed numerals and the correction of tilt, midpoint and brightness, if done at all, was accomplished by manual methods wherein the precisely controlled resistance on the circuit board was manually tuned until the desired numerals and the tilt, midpoint and brightness of the displayed bar segments was obtained. This procedure was slow and expensive in that it was done manually.

There is therefore a need in the art to provide a system for automatically observing displayed numerals in a digital display device and measuring the tilt, midpoint and brightness of the numbers in a digital display and automatically calibrating the resistance in the control circuitry.

SUMMARY OF THE INVENTION

A system for automatically observing and correcting the value of a digital numeric display and for automatically measuring and correcting the brightness of the numbers in the digital display device and for measuring the tilt and midpoint and providing an error message if the tilt or midpoint are unacceptable is provided by the present invention. The present method of manufacturing circuit boards for controlling digital displays and controlling the size of the included resistors utilizes a TV camera to read the generated display. The TV camera provides an input of displayed value and segment tilt, midpoint and brightness to a computer. The computer analyzes the output of the TV camera, determines the value of displayed numerals, determines tilt, midpoint, and brightness of various illuminated light bar segments, and sends a correcting signal to a laser which accurately sizes the appropriate resistors on the circuit board. The process is repeated until the desired value of displayed numerals and brightness of illuminated bar segments are obtained. Once the correct value and brightness are obtained, the circuit board calibration is complete and a new circuit board may be placed in the system for calibration.

BRIEF DESCRIPTION OF THE DRAWINGS

A better understanding of the manufacturing method of the present invention may be had by reference to the figure wherein.

BRIEF DESCRIPTION OF THE EMBODIMENTS

Figure 1:
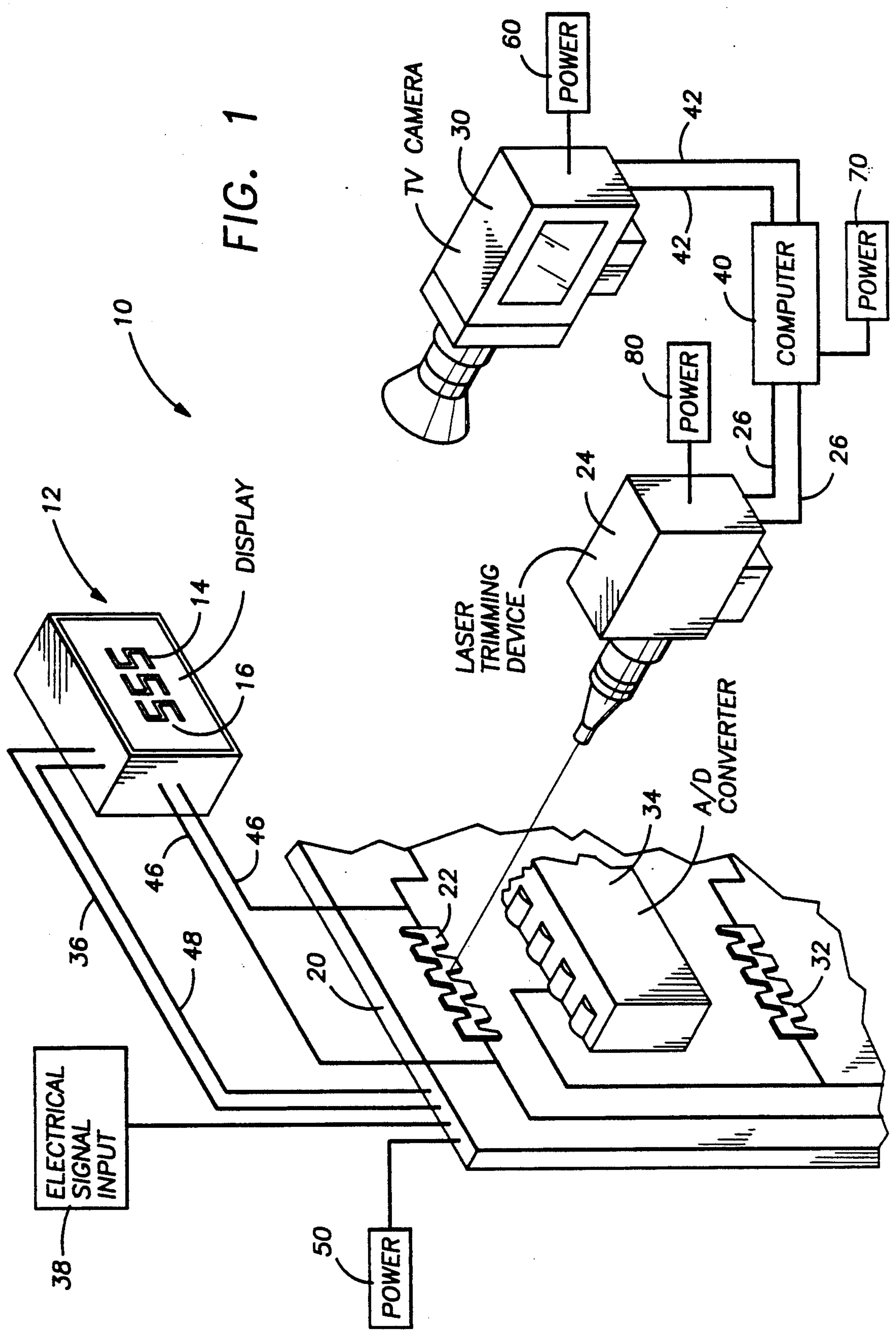
FIG. 1 is a schematic representation of the manufacturing method of the present invention.

Shown schematically in FIG. 1 is the method 10 of manufacturing circuit boards 20 of the present invention. A power source 50 provides power to the circuit board 20. Many circuit boards 20 are manufactured in quantity by the use of a resistive paint or ink 22 and 32 placed on the surface of the board. The actual resistance to the flow of electric current through the resistive paint or ink 22 and 32 can be accurately controlled by dimensionally trimming the size of the area covered by the resistive paint or ink 22 and 32 with a laser trimming device 24. This method of dimensionally trimming the size of the area covered by the resistive paint or ink 22 and 32 is commonly called laser trimming. The resistive paint of ink commonly is called a laser trimmed resistor. In situations where many circuit boards 20 are produced, the use of laser trimmed resistors has become well known.

In the particular case where circuit boards 20 are used to control a digital display device 12 as shown in the schematic of FIG. 1, a TV camera 30 is used to receive an image of numbers 14 which appear on the digital display device 12. A power source 60 provides power to the TV camera 30. The digital display device 12 receives power from output 48 of circuit board 20. The resistive areas 32 on circuit board 20 are used to calibrate the analog-to-digital converter 34 and therefore control the output 36 from the circuit board 20. Output 36 selectively toggles the illuminated light bar segments that comprise the displayed numbers 14 as they appear on the digital display device 12 corresponding to a particular analog signal input 38. Thus, an analog signal input 38 flows through the resistive area 32 into the analog-to-digital converter 34. According to conventional techniques, the analog-to-digital converter 34 provides output control signals 36 to the digital display device 12 to control the value of the numerical display. For example, output control signals 36 may include twenty-one separate lines electrically connected to the twenty-one light bar segments comprising the digital display device 12. The analog-to-digital converter 34 provides signals on the twenty-one lines to represent the analog signal input 38, and particular light bar segments are illuminated accordingly. When a discrepancy is detected in the value of the digital display device, resistive area 32 is trimmed to calibrate the output from the analog-to-digital converter 34 by altering the analog voltage input to the converter 34.

The resistive areas 22 on the circuit board 20 are used to calibrate the circuit board output 46, which controls the brightness of the displayed numerals 14 as they appear on the digital display device 12.

Figure 2A:
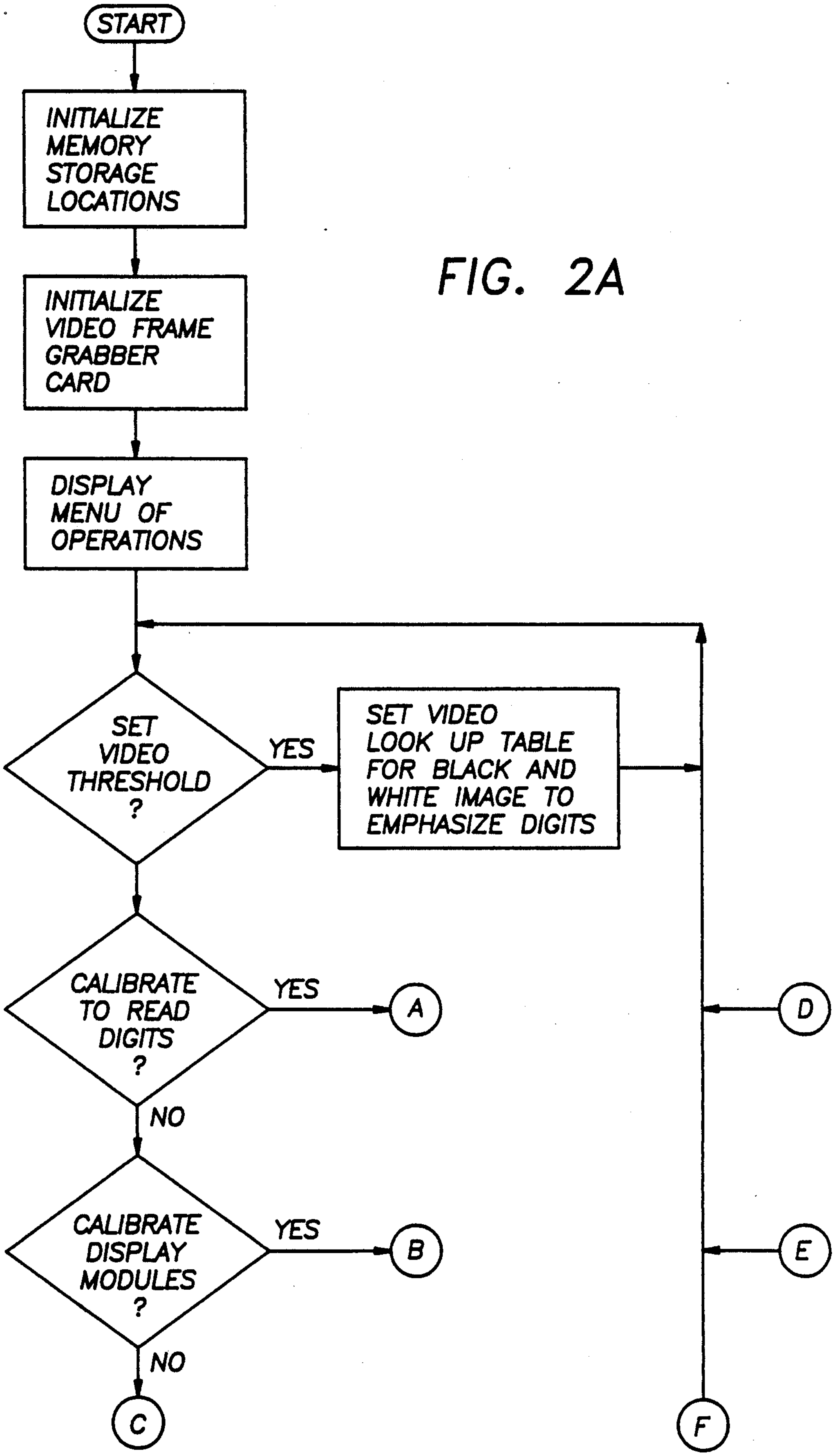
FIG. 2A is part of a flow chart illustrating the operation of the computer shown in FIG. 1.
Figure 2B:
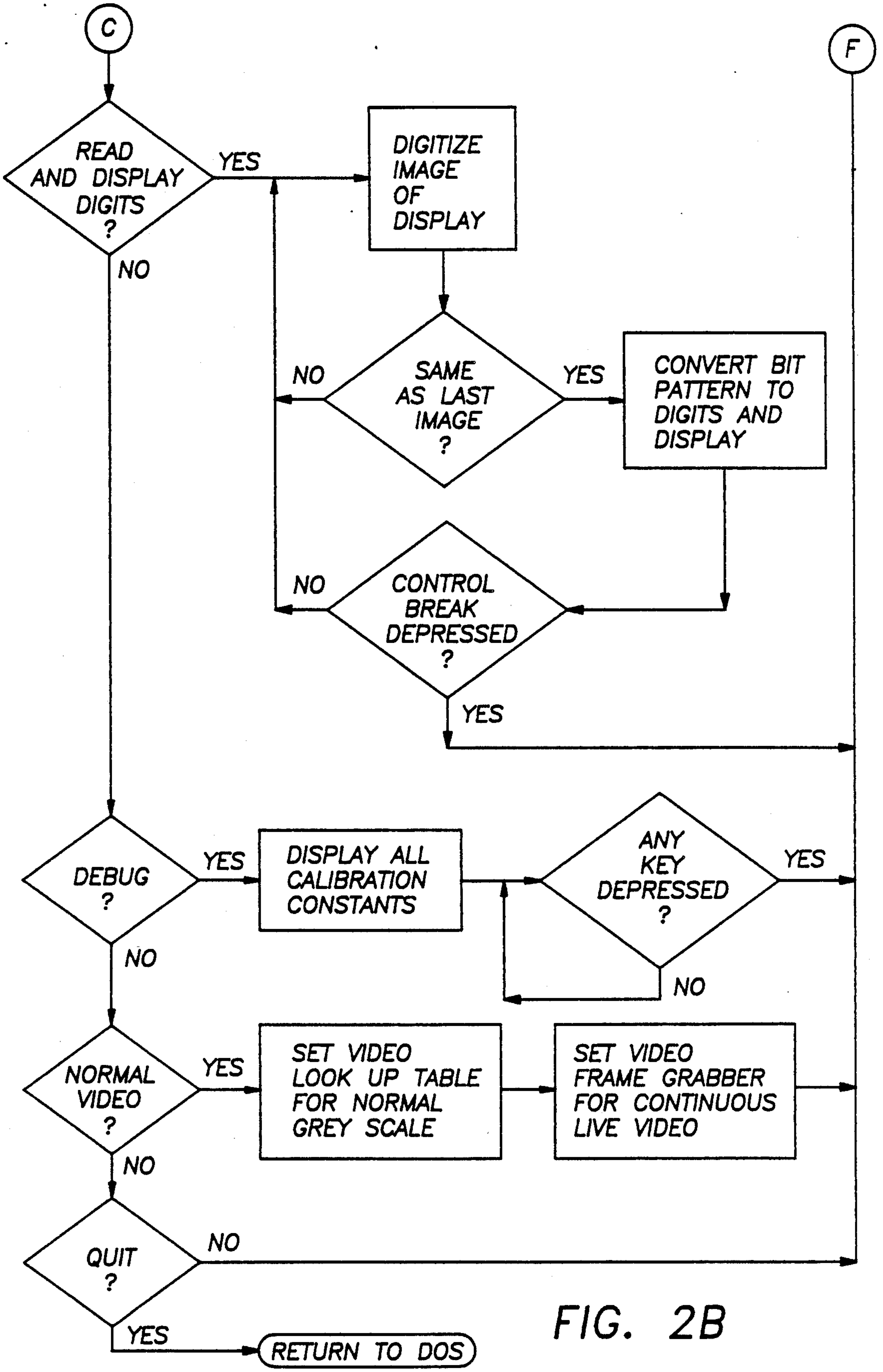
FIGS. 2B and 2C are parts of a flow chart illustrating the operation of the computer shown in FIG. 1.
Figure 2C:
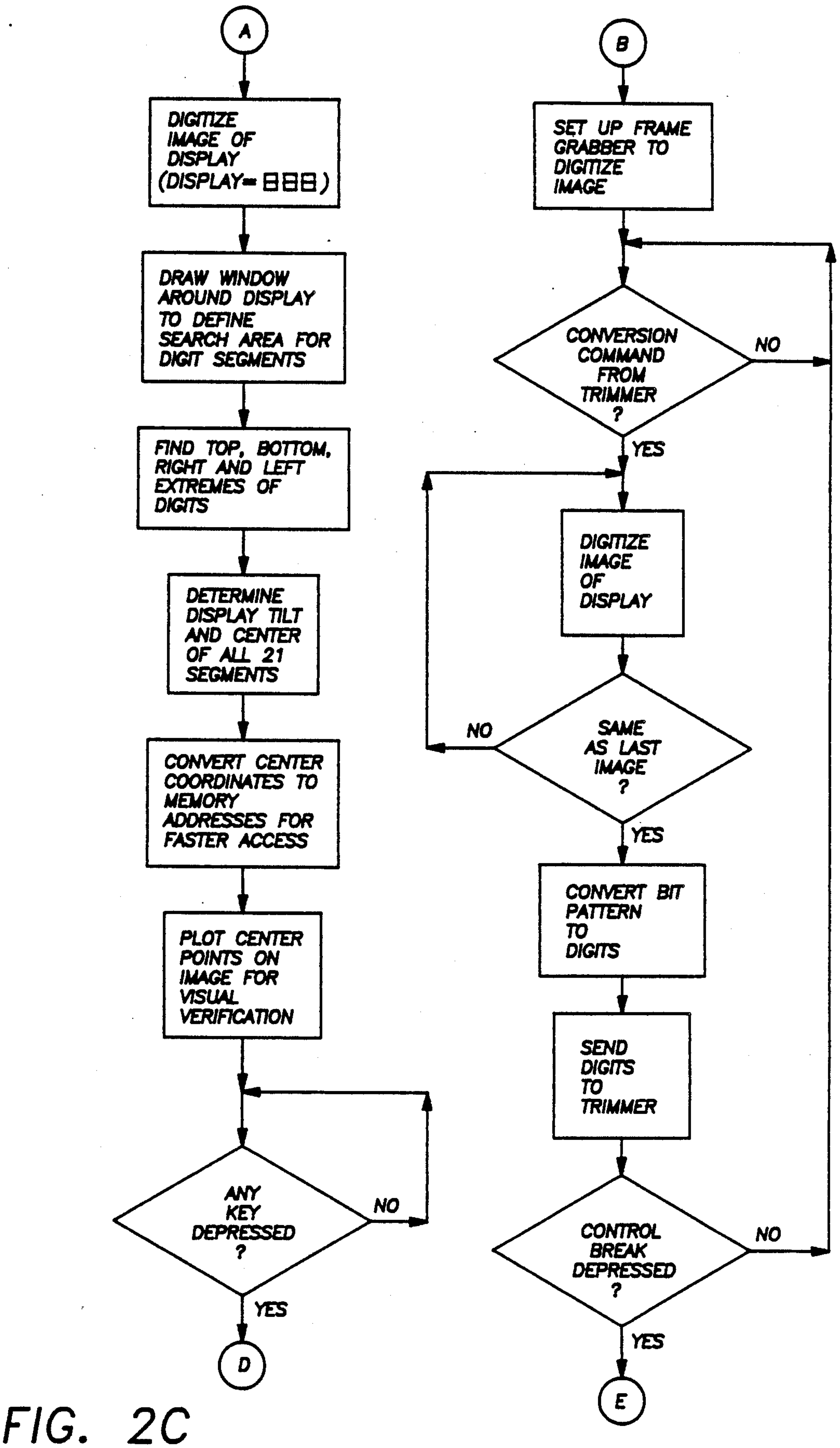

Once TV camera 30 takes a picture of digital display device 12, the signals 42 from TV camera 30 are sent to a computer 40. A power source 70 provides power to the computer 40. Computer 40 translates the signals from the TV camera into inputs 26 for laser trimmer 24. A power source 80 provides power to the laser trimmer 24. The computer translates the TV camera output signals 42 to the laser trimmer input 26 according to the method shown in the Flow Chart of FIGS. 2A and 2B. Laser trimmer 24 then accurately trims resistors 22 and 32 to their appropriate size so that the value and brightness of displayed numerals 14 in digital display device 12 are as desired.

There is thereby provided by the manufacturing method 10 of the present invention a method for manufacturing circuit boards including digital display control circuitry. Such manufacturing method is faster and more accurate than manual means previously used. If desired, the present method may be used only for inspection to identify those circuit boards falling out of acceptable tolerance limits.

The manufacturing method of the present invention now having been explained with reference to the preferred embodiment will teach those of ordinary skill in the art other embodiments of this invention without departing from the scope of the appended claims.

I claim:

1. A method of manufacturing a circuit board including circuitry for controlling the characteristics of numerals in a digital display device, said circuit board including laser trimmed resistors, wherein the method comprises the steps of:

causing said circuit board to produce the numerals in said digital display device;

imaging said digital display device with a TV camera;

providing an output signal from said TV camera;

translating the output signal from said TV camera into an input for a laser trimming device;

laser trimming the laser trimmed resistors with said laser trimming device until the numerals in the digital display exhibit the desired characteristics.

2. The method as defined in claim 1 wherein one of the characteristics is the value of the numerals in the digital display.

3. The method as defined in claim 1 wherein the numerals in the digital display device include light bar segments, and one of the characteristics is brightness of said segments.

4. The method of manufacturing as defined in claim 1 wherein said translating of the output signal of said TV camera into an input for the lacer trimming device is accomplished by a computer.

5. The method as defined in claim 1 wherein the laser trimmed resistor is used for calibrating an analog-digital converter.

6. A method for inspecting the quality of a circuit board used for controlling numerals on a digital display device comprising the steps of:

causing said circuit board to display the numerals on the digital display device;

imaging said digital display device with a TV camera;

providing an output signal from said TV camera;

translating the output signal from said TV camera into an input signal for a computer; and comparing said input signal with predetermined quality standards programmed into said computer.

7. The method as defined in claim 6 wherein one of the quality standards is tilt of illuminated light bar segments comprising the numerals in said digital display device.

8. The method as defined in claim 6 wherein one of the quality standards is midpoint of illuminated light bar segments comprising the numerals in said digital display device.

9. The method as defined in claim 6 wherein one of the quality standards is brightness of illuminated light bar segments comprising the numerals in said digital display device.

10. The method as defined in claim 6 wherein one of the quality standards is the value of the numerals in said digital display device.

* * * * *

UNITED STATES PATENT AND TRADEMARK OFFICE
CERTIFICATE OF CORRECTION

PATENT NO. : 4,998,207

DATED : March 5, 1991

INVENTOR(S) : L. Buck Postlewait

It is certified that error appears in the above-identified patent and that said Letters Patent is hereby corrected as shown below:

Col. 4, line 13, claim 4 change "lacer" to --laser--.

Signed and Sealed this

Twenty-ninth Day of December, 1992

*Attest:*

DOUGLAS B. COMER

*Attesting Officer*

*Acting Commissioner of Patents and Trademarks*